(No Model.)
E. THOMSON.
METHOD OF ELECTRIC WELDING.
No. 444,926. Patented Jan. 20, 1891.
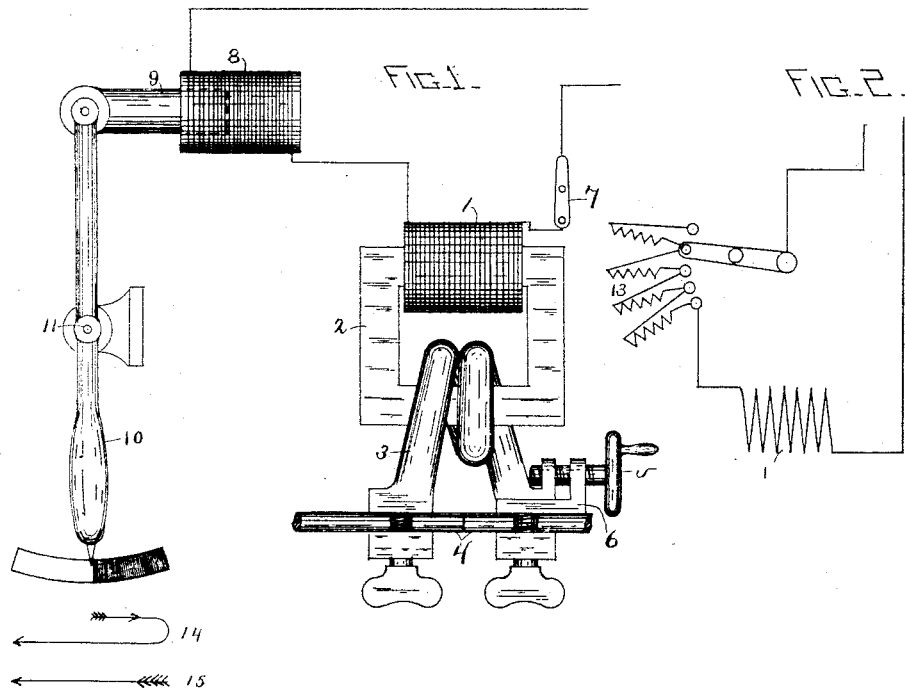
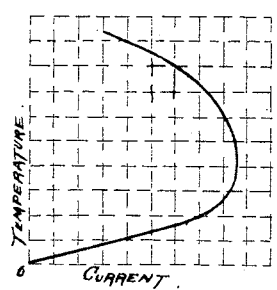
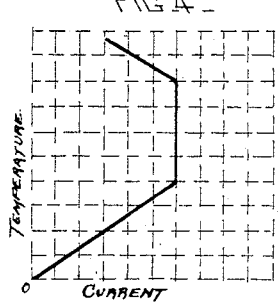
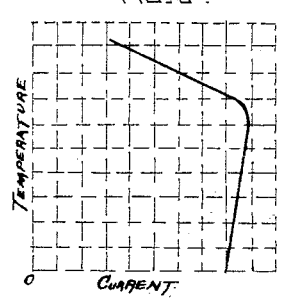
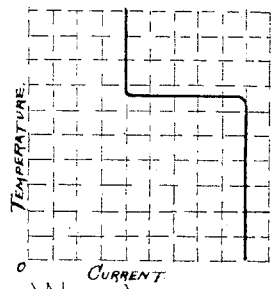
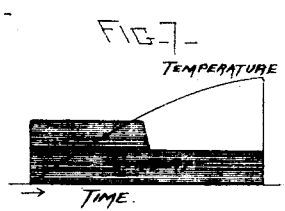
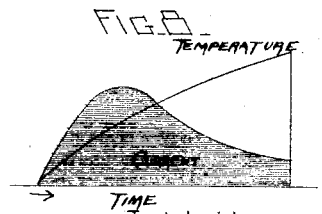
WITNESSES
INVENTOR
Elihu Thomson
By H. C. Townsend
Atty

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 444,926, dated January 20, 1891.

Application filed May 15, 1888. Serial No. 273,985. (No model.)

*To all whom it may concern:*

Be it known that I, ELIHU THOMSON, a citizen of the United States, and a resident of Lynn, in the county of Essex and State of Massachusetts, have invented a certain new and useful Method of Electric Welding, of which the following is a specification.

My present invention relates, generally, to the processes of welding, brazing, soldering, forging, and the attendant operations in which an electric current of large volume passed through the pieces or parts operated upon is employed as the means for heating them to the desired or requisite temperature.

My invention is applicable more particularly, however, to the operations of electric welding set out in my prior patents, Nos. 347,140 and 347,141.

The object of my invention is to facilitate the operations and at the same time to keep control of the temperature of the objects operated upon.

My invention consists, essentially, in gradually or suddenly putting on a current capable, if continued, of heating the object beyond the necessary or desired temperature and subsequently and before such temperature is reached diminishing or lessening the current, with the effect of preventing overheating or too rapid heating, or by proper graduation, with the effect of keeping the temperature of the object of the same or even lowering its temperature when such effect is desired. Thus in cases where the resistance of the object rises rapidly while heating, overheating may readily take place on the application of current, either gradually or suddenly; but this is prevented by diminishing the current at the time the required heating is nearly obtained. Since the heat given out varies as the square of the current multiplied by the resistance, the importance of my method will be readily seen. Again, in cases where, after the operation of welding, forging, or the like, a reduction of temperature is required, but the object should still be kept hot, (as, for instance, in the operation of case-hardening iron or steel by keeping at a red heat and applying a case-hardening substance,) the current may be reduced sufficiently to cause its temperature to fall to the proper or desired degree and to be maintained at such point. The same reduction of the current may be made likewise, so as to permit the hammering or other working of the object at less than the welding or forging heat. In the two latter cases it is obvious that the reduction of current may start from a strength of current which would not even, if continued, produce excessive or injurious heating of the object.

It is to be observed that whether the current is put on gradually or at once with its maximum volume the heating will be gradual, owing to the gradual accumulation of heat at the joint, and that it would be possible to produce a gradual increase of heating even if the current were diminished gradually from the time that it is turned on.

In the practice of my invention the objects are placed in the proper conducting-clamps described in my prior patents before referred to, and the current graduated or controlled by any of the means known in the art—as, for instance, by varying the magnetic field of the dynamo-machine which gives the current energy, by varying the resistance interposed in the circuit of the welding currents, by varying the resistance or the inductive resistance in either the primary or secondary of the induction coil or converter when the converter is used for developing the welding current of large volume, by varying the reaction or self-induction of the armature or welding circuit when alternating currents derived directly from a dynamo-machine are employed, by varying the inductive relation of the primary and secondary of the converter through changes in their relative position or in the mass or position of the mass of iron of the converter, by varying the speed of the dynamo from which the current is directly or indirectly derived, by varying the position of the commutator of the dynamo, or by any other desired means.

In the case of welding the following procedure may be adopted, though it is subject to variations, without departing from the invention which I have herein claimed. The pieces to be welded having been placed in the clamps and pressed into good contact, the current is gradually or suddenly turned on in large amount, thereby causing the material to rapidly accumulate heat at the joint. When the welding temperature is nearly reached, the current is diminished, but not so much as to prevent a rise of the temperature to the welding-point. When this point is reached, the pieces are pressed together and the weld perfected, after which the current may, if desired, be still further lowered for subsequent operations.

Figure 1 is a diagram of apparatus that may be employed in practicing my invention. Fig. 2 illustrates a modified apparatus. Figs. 3 to 8, inclusive, are graphical representations of certain relations of current and heating hereinbefore referred to.

In Fig. 1, 3 is the secondary, 2 the iron core, and 1 the primary, of any alternating-current transformer adapted to transform alternating currents flowing in the circuit of 1 into currents of large volume but low electromotive force for application to the bars or rods 4 to be welded or to other work.

6 is any sliding clamp worked by means of a screw 5 or other mechanism. In this figure the means for varying the current consists of a coil 8 in the circuit of 1 and an iron core 9, working in said coil and operated by a lever 10, pivoted at 11. The arrow 14 indicates the movement to be given to the lever in order to first increase and then decrease the current and the arrow 15 the movement which is given in simply decreasing the current.

The device 8 9 varies the reaction of the circuit and so changes the current in the coil 1 in the ordinary and well-known manner.

7 is a switch for opening the circuit of the primary. The current might be varied by simply changing the amount of dead resistance 13, Fig. 2, in the circuit of the primary 1 for the transformer. The resistance is thrown into and out of the circuit by means of a switch-handle, in the well-known manner.

In the relations of current and temperature represented in Figs. 3, 4, 5, and 6 the temperature is indicated by the vertical distances and the amount of current by the horizontal distances from the zero-point, the heavy black line showing the changes or condition at any given time.

In Fig. 3 the current is gradually increased and then decreased, but not so rapidly but what the temperature always increases. This increase of temperature is due to the fact that the resistance becomes greater as the heat rises and less current is required to produce the heating expressed by $C^2, R$.

Fig. 4 represents a case where the current is increased, is then kept at constant amount for some time, and then decreased, the temperature increasing all the time.

In Fig. 5 a case is illustrated where a large current is applied at the start, instead of a gradually-increasing one, and is then gradually decreased.

Fig. 6 illustrates a case where the current is applied and not increased. As the temperature becomes high the current is suddenly and rapidly decreased, so as to keep the temperature stationary, and then the current is held and the temperature allowed to increase.

Figs. 7 and 8 illustrate certain conditions or relations of temperature and current in another way, the shaded portions, marked "current," representing by their distance above the horizontal line the varying volume and the other curved line representing the rise in temperature.

I do not claim herein diminishing the current gradually from the time that it is turned on, as this forms the subject of claims in another application for patent filed of even date herewith, No. 273,986.

What I claim as my invention is—

1. The herein-described improvement in processes of electric welding, &c., which consists in applying to the objects a heating-current of the proper or desired volume and subsequently reducing the volume of such current, as and for the purpose described.

2. The herein-described improvement in processes of electric welding, &c., which consists in applying to the object a current of large volume, as described, and subsequently lowering the volume of the current to reduce the accumulation of heat.

3. The herein-described improvement in processes of electric welding, &c., which consists in applying to the object a current of the requisite amount and subsequently lowering the current in amount sufficient to lower the temperature of the object.

4. The herein-described improvement in electric welding, &c., which consists in first applying a current of large heating effect, permitting the object to accumulate heat under such current until the requisite temperature is nearly reached, and then lowering the current, but not so much as to prevent rise of temperature to the proper point.

5. The method of electric welding which consists in putting the pieces in contact with a suitable pressure, applying a current of gradual heating effect, and then diminishing the volume of such current.

6. The herein-described improvement in the method of forming a case-hardened joint, which consists in forming the weld or joint by an electric current of the desired volume and subsequently diminishing the current to bring and maintain the object at the proper case-hardening temperature.

Signed at Lynn, in the county of Essex and State of Massachusetts, this 11th day of May, A. D. 1888.

ELIHU THOMSON.

Witnesses:
J. W. GIBBONEY,
F. R. HILL.